Patented Mar. 26, 1935

1,995,908

UNITED STATES PATENT OFFICE 1,995,908

PROCESS OF ABSORBING OLEFINES HAVING THREE OR MORE CARBON ATOMS IN THE MOLECULE IN STRONG ACIDS

Adrianus Johannes van Peski, Amsterdam, Netherlands, assignor to Shell Development Company, San Francisco, Calif.

No Drawing. Application May 2, 1932, Serial No. 608,872. In Great Britain June 4, 1929

5 Claims. (Cl. 260—99.12)

This invention concerns an improved method of absorbing olefines having three or more carbon atoms and one or more double bonds in the molecule in suitable strong acids and it concerns also the production of the corresponding esters, ethers, alcohols or other compounds therefrom.

It is an object of this invention to provide a process of the aforesaid nature, by which the rate of absorption may be considerably increased as compared with that of the known processes of absorbing olefines in strong acids. Another important object of the invention is to avoid entirely or as far as possible the formation of undesirable oily polymerization products, which are frequently formed when absorbing olefines in the aforementioned manner by the usual methods.

It is known that ethyl alcohol, isopropyl alcohol, butyl alcohol and the like may be obtained by combining the corresponding olefines with sulphuric acid and hydrolyzing the sulphates obtained. Besides alcohols, other compounds such as esters or ethers, may be prepared by first absorbing the olefines in sulphuric acid and then converting the reaction products in a known manner.

The rate of absorption of olefines by means of sulphuric acid in the usual way is generally slow. Different catalysts have been proposed for increasing the rate of absorption; a large group of very active catalysts for said purpose have been described in British Patent No. 323,748.

It has now been found that other substances also serve to facilitate the reaction.

According to this invention the improved method of absorbing olefines having three or more carbon atoms and one or more double bonds in the molecule in strong acids in the presence of catalysts is characterized by employing as catalysts those comprising copper or compounds thereof.

The invention also consists in employing as the absorption media strong acids containing as catalysts copper compounds in a soluble form. The compounds may be dissolved in the acids or soluble complex compounds may be formed within the acids.

If copper is used this should preferably be brought into a very finely divided condition, for example colloidally precipitated on a carrier such as carbon black, silica gel, decolorizing clay or the like.

Sometimes it is advantageous previously to convert the aforesaid substances into soluble complex compounds, examples of which will be given hereinafter. Both cuprous and cupric compounds are suitable.

The soluble copper compounds may be formed by the addition of copper to the strong acids or the soluble copper compounds may be those obtainable from copper or copper compounds brought into a soluble form by conversion into soluble complex compounds.

The following examples illustrate how the process of this invention may be carried into effect:

1. When propylene is passed through 100 cc. of 90 per cent sulphuric acid, in which 5 grams of cuprous cyanide have been dissolved, 71 per cent of the propylene is absorbed.

2. 5 grams of cuprous oxide are added to 100 cc. of 90% sulphuric acid. A stream of carbon monoxide is then passed through the mass, forming a soluble complex compound with the cuprous oxide. Propylene is now passed through the absorbing liquid, when 90% of the propylene is absorbed.

Instead of carbon monoxide, ethylene or nitric oxide (NO) may be used for converting various insoluble compounds of copper into soluble complex compounds.

The reaction may be performed at ordinary, lower or higher pressures and temperatures. Other acids such as phosphoric acid or suitable sulphonic acids may also be used as absorption liquids.

Moreover the process may be carried out in the presence of substances which are known to accelerate the absorption reaction, such as foam- or froth-forming substances, emulsifiers and the like. Furthermore the olefines to be absorbed may be dissolved in suitable solvents before being brought into contact with the strong acid.

In order to promote the solubility of the olefines suitable solvents such as alcohol, ether, nitrobenzol or acetic acid may be added to the strong acid.

The strong acids containing absorbed olefines are subjected to treatment such as by hydrolysis and/or distillation or in other known manner for the production of compounds such as alcohols, esters or ethers.

Also mixtures of the aforementioned catalysts may be used. Furthermore the method of this invention may be applied to gases, such as "cracked" gas or the like, which contain olefines having three or more carbon atoms and one or more double bonds in the molecule, without previously separating said olefines from the gases.

The medium used as a basis of determining the solubility of the copper compounds is the strong absorption acid.

I claim as my invention:

1. An improved method of catalytically absorbing olefines having at least three carbon atoms and at least one double bond in the molecule in a strong acid, comprising effecting the absorption in the presence of a catalyst consisting of cuprous cyanide.

2. An improved method of catalytically absorbing olefines having at least three carbon atoms and at least one double bond in the molecule in a strong acid, comprising effecting the absorption in the presence of a catalyst containing essentially soluble complex copper compounds, which are obtained by treating copper compounds dissolved in the absorption acid with a monovalent reducing agent capable of forming soluble complex copper compounds with copper compounds.

3. An improved method of catalytically absorbing olefines having at least three carbon atoms and at least one double bond in the molecule in a strong acid, comprising effecting the absorption in the presence of a catalyst containing essentially soluble complex copper compounds, which are obtained in the absorption acid by treating insoluble copper compounds with a monovalent reducing agent capable of forming soluble complex copper compounds with copper compounds.

4. An improved method of catalytically absorbing olefines having at least three carbon atoms and at least one double bond in the molecule in a strong acid comprising effecting the absorption in the presence of a catalyst of the class consisting of cuprous cyanide and soluble complex copper compounds.

5. A method of catalytically absorbing olefines having at least three carbon atoms and at least one double bond in the molecule in a strong acid as set forth in claim 4, in which the soluble complex copper compounds are prepared by treating copper compounds with nitric oxide.

ADRIANUS JOHANNES van PESKI.